United States Patent [19]

Tingley

[11] Patent Number: 5,362,545
[45] Date of Patent: Nov. 8, 1994

[54] ALIGNED FIBER REINFORCEMENT PANEL FOR STRUCTURAL WOOD MEMBERS

[76] Inventor: Daniel A. Tingley, 3310 SW. Willamette Ave., Corvallis, Oreg. 97333

[21] Appl. No.: 37,580

[22] Filed: Mar. 24, 1993

[51] Int. Cl.⁵ .................... B32B 5/08; B32B 5/16; E04C 3/26; E04C 3/29
[52] U.S. Cl. ................... 428/96; 52/309.16; 52/727; 52/730.1; 52/DIG. 7; 156/630; 156/632; 156/154; 156/155; 264/172; 264/229; 264/231; 264/232; 428/114; 428/294
[58] Field of Search ............ 428/294, 114, 96, 902; 264/172, 229, 231, 232; 156/630, 632, 154, 155; 52/223, 309.16, 727, 730.1, DIG. 7

[56] References Cited

U.S. PATENT DOCUMENTS

| | | |
|---|---|---|
| 2,536,183 | 1/1951 | Jamieson . |
| 3,413,188 | 11/1968 | Allen . |
| 3,890,077 | 6/1975 | Holman . |
| 4,108,351 | 8/1978 | Hough . |
| 4,242,406 | 12/1980 | Bouhnini et al. ............ 428/236 |
| 4,312,162 | 1/1982 | Medney . |
| 4,615,163 | 10/1986 | Curtis et al. . |
| 4,965,973 | 10/1990 | Engebretsen . |
| 5,000,808 | 3/1991 | Deviney . |
| 5,006,390 | 4/1991 | Kavesh et al. . |
| 5,026,593 | 6/1991 | O'Brien . |
| 5,135,793 | 8/1992 | Socha . |

FOREIGN PATENT DOCUMENTS

4149346 5/1992 Japan .

OTHER PUBLICATIONS

Rowlands et al, "Fiber-Reinforced Wood", *Wood and Fiber Science*, Jan. 1986, v 18(1), pp. 39-57.

Tingley, Reinforced Glued–Laminated Wood Beams, 96 page Thesis Accepted Nov. 1987 by the University of New Brunswick (Canada) as Partial Fulfillment for M.S. Eng. Dept. of Civil Engineering.

Tingley, "Predicting Strength Criteria for Kevlar and Fiberglass Reinforced Plastic (KRP & FRP) Glued Laminated Beams", pp. 301-304 from vol. 2 of the Proceedings of the Second *Pacific Engineering Conference*, 1989.

Wood Design Focus, A Newsletter of Contemporary Wood Engineering, vol. 4, No. 2, Summer 1993, R. J. Leichti, Editor.

van de Kuillen, Proceedings of the 1991 International Timber Engineering Conference, vol. 3, Sep. 2-5, 1991, pp. 226-233.

Tingley, Proceedings of the 1988 International Conference on Timber Engineering, vol. 1, Sep. 19-22, 1988, pp. 422-427.

*Primary Examiner*—James C. Cannon
*Attorney, Agent, or Firm*—Stoel Rives Boley Jones & Grey

[57] ABSTRACT

A reinforcing panel and process for making the same for use in reinforcing wood structural members including laminated beams, wood I-beams, and trusses. The reinforcing panel is comprised of a plurality of synthetic fibers that are arranged parallel to one another and aligned with the longitudinal direction of the panel, and accordingly the wood structure. The panel has substantially no transverse fibers. The fibers are maintained in position by a resin encasement that completely encloses the fibers with the exception of some fibers that are closest to the surface. The surface of the reinforcing panel is treated so that those fibers closest to the surface of the panel are caused to "hair up" so that the reinforcing panel may be used with non-epoxy adhesives which are commonly used in the laminated beam industry, such as resorcinol. The reinforcing panel of the present invention is fabricated by an improved protrusion process which uses no mandrels, or woven mats and which provides for a selectable back pressure so that the fibers of the reinforcement panel are maintained in a state of tension during the resin cure, thereby: maintaining the parallel arrangement of the fibers, maintaining the longitudinal alignment of the fibers, and setting the initial strain of the fibers to decrease the initial deflection of a wood structure that is reinforced with the reinforcing panel of the present invention.

28 Claims, 4 Drawing Sheets

ALIGNED FIBER REINFORCEMENT PANEL FOR STRUCTURAL WOOD MEMBERS

BACKGROUND OF THE INVENTION

This invention pertains to reinforcement of structural wood, such as beams, columns and trusses. More particularly, the present invention pertains to the use of unidirectional fibers as a reinforcement in structural wood members to improve the tensile or compressive loading of the wood member.

DESCRIPTION OF THE RELATED ART

To remain competitive, wood product engineers have had to adopt innovative designs in combination with alternate materials to enhance the structural limits and cost effectiveness of engineered wood products. Examples of engineered wood products include glued laminated wood beams, laminated wood columns, wood I-beams, and wood trusses. The prior art is replete with examples of these engineered wood products.

O'Brien, U.S. Pat. No. 5,026,593 discloses the use of a thin flat aluminum strip to reinforce a laminated beam. O'Brien teaches that the aluminum strip must be continuous across the width and length of the beam and that the reinforcing strip may be adhesively fixed to the lowermost lamina to improve tensile strength, or to the uppermost lamina to improve strength in compression of the beam. Thus, while O'Brien teaches the engineering principal of locating a reinforcement strip in a wood laminated beam to improve the tensile strength (or strength in compression) of the beam and thus to improve the overall load carrying capacity of the beam, O'Brien only teaches the use of an aluminum reinforcing strip. And although O'Brien states that the reinforcing strip may be any "high tensile strength" material, O'Brien does not teach nor suggest means for optimizing the reinforcing strip nor of solving problems associated with the use of reinforcing strips other than aluminum.

At the 1988 International Conference on Timber Engineering a paper was presented entitled "Reinforced Glued-Laminated Wood Beams" by Mr. Dan A. Tingley (hereinafter "Tingley Paper") that disclosed the use of reinforced plastics (RP) in glue laminated wood beams (glulams). The Tingley paper disclosed test results of glulams having "KEVLAR" reinforced plastic panel(s) located at high stress areas. The results indicated a 19% improvement in ultimate load-to-failure of beams with "KEVLAR" reinforcement as opposed to nonreinforced beams. Although not disclosing why longitudinal alignment was desirable or how it was achieved, the paper states that the manufacturers were able to achieve one hundred percent longitudinal alignment of fibers. The paper also disclosed that the reinforcing panel was sanded on two sides and further stated that the sanded surfaces of the "KEVLAR" reinforced panel was found to be important. However, the paper does not disclose why the sanding was important nor a suggestion that the sanding process exposed or abraded the "KEVLAR" fibers. The Tingley paper also teaches that there are economic advantages to shortening the length of the RP relative to the length of the glulam beam without significant reduction of reinforcement benefit in beam strength. The Tingley paper does not disclose any process for fabricating RP reinforcement panels, nor benefits associated with curing the panels while the fibers are in tension to reduce initial strain. Nor does the paper disclose the benefits of exposing some of the outermost fibers in order to "hair up" the RP to produce a surface that facilitates the use of commercial grade adhesives such as resorcinol. On the contrary, the paper teaches away from resorcinol adhesives by teaching the use of epoxies to adhere the RP to the surrounding wood laminae even though the less expensive commercial adhesive, resorcinol, was used between the other layers of wood laminae.

Another area of related art is the fabrication process of pultrusion. Pultrusion is defined as a continuous manufacturing process for producing lengths of fiber reinforced plastic parts. Pultrusion involves pulling flexible reinforcing fibers through a liquid resin bath and then through a heated die where the RP is shaped and the resin is cured. Pultrusion is known for its ability to fabricate a continuous length of RP and to accommodate custom placement and orientation of fibers, which allows for the mechanical properties of the pultruded part to be designed for a specific application. Pultruded parts have longitudinally aligned fibers for axial strength and obliquely aligned fibers for transverse strength.

SUMMARY OF THE INVENTION

The present invention improves upon the teachings of the prior art of using RP panels as reinforcement in laminated wood beams and other wood structural members. The present invention provides a panel that comprises many thousands of high strength fibers, all of which are arranged substantially parallel with one another and aligned with the longitudinal axis of the reinforcing panel. Fibers that are closest to the surface are abraded to "hair up" the panel's surface so that commercial grade adhesives, such as resorcinol, may be used to adhere the RP panel to the wood structure.

The present invention also comprises mixed fiber RPs wherein there is a core of continuous length aligned fibers and an outer layer (or layers) of noncontinuous fibers that have been abraded to hair up the RP to facilitate adhesion of the panel to a wood structure. Mixed fiber RPs are significant where design considerations call for using a fiber which cannot hair up. For example, to fabricate a panel having a high strength in compression, carbon fibers are sandwiched between "KEVLAR" because carbon has a superior modulus of elasticity in compression over most other commercial fibers and "KEVLAR" can hair up for a superior adhesive surface, whereas a panel comprising only carbon fibers would require epoxy based adhesives to adhere the panel to the adjacent laminae of wood.

The present invention also comprises the fabrication process of making the panel wherein substantially all the fibers are arranged and aligned and tensioned while the resin is cured in a heated die.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 3b is an alternative embodiment of the panel shown in FIG. 3a.

FIG. 3c is an alternative embodiment of the panel shown in FIG. 3a.

DETAILED DESCRIPTION OF THE PREFERRED EMBODIMENTS

Figure 4:
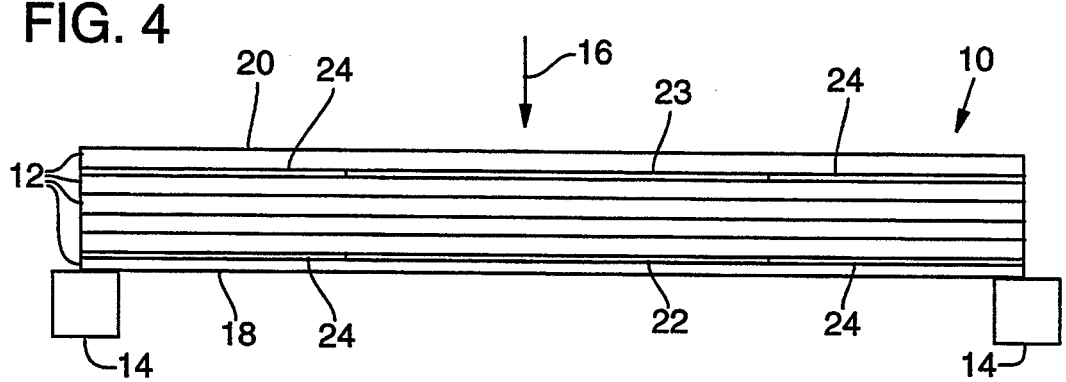
FIG. 4 is an elevation view of a wood laminated beam having reinforcing panels of the present invention located between the laminae.
Figure 5:
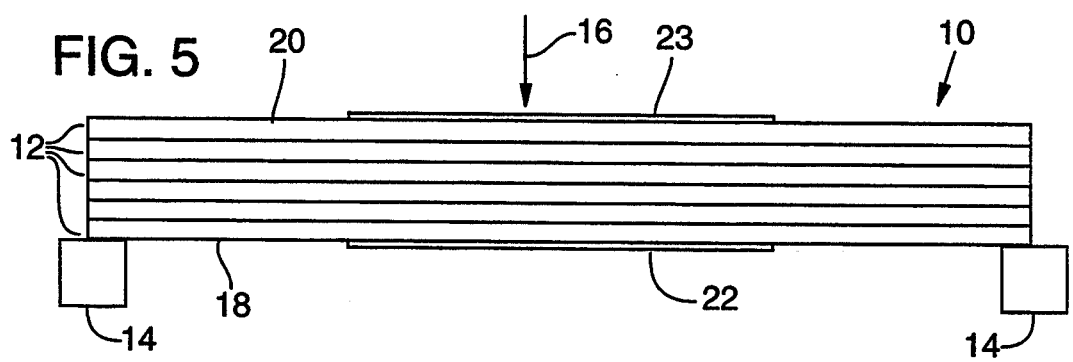
FIG. 5 is an elevation view of a wood laminated beam having reinforcing panels of the present invention located on exterior surfaces thereof.

The present invention is best understood by beginning with a description of its use. With reference to FIGS. 4 and 5 there is shown a glued laminated wood beam 10 having a plurality of laminae 12. Each lamina 12 is preferably an elongate wood board.

A primary structural use of laminated beams is to span an open area, represented as an area between blocks 14, and support a load as represented by arrow 16. When thusly configured, the lower most lamina 18 is subjected to a substantially pure tensile stress. Conversely, the uppermost lamina 20 is subjected to a substantially pure compressive stress. Scientists have found that the load-bearing capacity of laminated beams may be substantially increased by adding a reinforcing panel 22 or 23 in the areas of greatest stress; namely, closest to the lowermost lamina or uppermost lamina 18, 20, respectively. Reinforcing panel 22 is distinguished from reinforcing panel 23 because panel 22 is designed for, and located at, areas of high tensile stress, whereas panel 23 is designed for and located at areas of high compressive stress. In FIG. 4 the reinforcing panel 22 is shown between the lowermost lamina 18 and its adjacent lamina and the panel 23 is shown between the uppermost lamina 20 and its adjacent lamina.

In FIGS. 4 and 5 the length of the reinforcing panel is approximately three-fifths of the beam length. Testing has shown, and been disclosed in the prior art, that a reinforcing panel which covers two-fifths to three-fifths of the central portion of the beam provides substantially all the benefit of a full-length reinforcing panel, but at a lower cost per beam. In FIG. 4 the reinforcing panel is mounted between lamina and extends approximately three-fifths of the length of the beam, thus requiring spacers 24 to be located adjacent the ends of the reinforcement panel 22. The spacers 24 may be of wood. When the reinforcing panel is located on the exterior of the beam, as in FIG. 5, no spacers are required.

In the preferred embodiment of the present invention, and under conditions established above, namely, a simple beam with point loading or uniform loading, the lowermost reinforcing panel 22 will be comprised of a material having high strength in tension whereas the uppermost reinforcing panel 23 will be comprised of materials having a high strength in compression. It is to be understood that the configurations shown in FIGS. 4 and 5 are suitable for the loading conditions associated with those figures only. If the laminated beams were subjected to different loading, the optimum configuration of locating the reinforcing panel would be different. For instance, if the laminated beam were cantilevered, design considerations would require that the reinforcing panel having the most strength in tension be located on the upper portion of the beam whereas the reinforcing panel having the most strength in compression would be located on the lower portion of the beam. Also, in a cantilever loading situation the reinforcing panels would not be located at a center of the beam length, but rather would be located along the beam at the areas of maximum strain.

Figure 6:
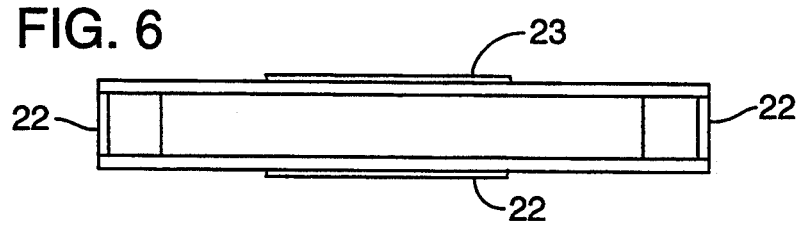
FIG. 6 is an elevation view of a wood I-beam showing preferred locations of reinforcing panels of the present invention for improving the load-carrying capacity of the I-beam.
Figure 7:
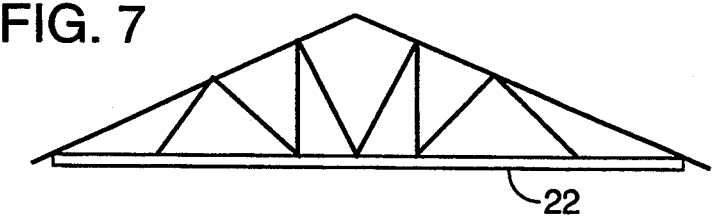
FIG. 7 is an elevation view of a wood truss showing a preferred location for a reinforcing panel of the present invention for improving the load-carrying capacity of the truss.

FIGS. 6–7 show alternative configurations of wood structural members and preferred locations for mounting the reinforcing panels for maximum benefit of increasing the load bearing capacity of the structural members. FIG. 6 shows a wood I-beam having reinforcing panels along the top, the bottom, and on the web portions at the distal ends. FIG. 7 shows a wood truss having a reinforcing panel 22 mounted at the location of highest tensile stress. FIGS. 4–7 are included herein to show some applications of the reinforcing panel of the present invention and are not intended to include all applications for all types of wood structures for which the reinforcing panel of the present invention is suitable. It is to be understood that the reinforcing panels of the present invention are also suitable for solid wood beams and columns, and other engineered wood structures, such as PARALLAMS and laminated veneer lumber.

Figure 3A:
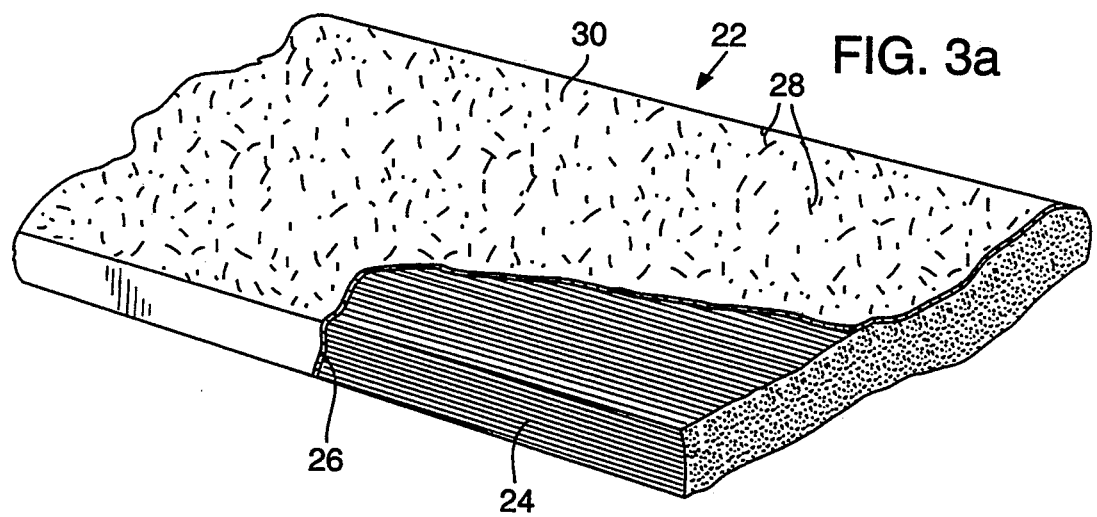
FIG. 3a is a perspective view of a portion of a panel of the present invention, partially cut away to show alignment and orientation of the fiber.

A preferred embodiment of the reinforcing panel of the present invention is shown in FIG. 3a. The panel 22 comprises a plurality of synthetic fibers 24 that are arranged parallel to one another and aligned with a longitudinal direction of the panel. The fibers 24 are maintained in their arrangement and alignment by a resin encasement 26 that surrounds the fibers and fills the interstices between the fibers. The panel 22 has been treated, as described below, so that the surface areas 30 that will be adhered to the wood structure have exposed fibers 28 to facilitate adhesion.

The parallel arrangement and longitudinal alignment of the fibers 24 provides a panel having maximum strength because the strength comes from the fibers (not the resin) and the configuration of fibers in the present invention permits the maximum density of fibers. Commonly, reinforced plastic parts have a fiber to resin volume ratio of 40/60. However, the configuration of fibers in the present invention permits fiber to resin volume ratios as high as 60/40 when fabricated by the pultrusion method. Furthermore, the configuration of fibers in the present invention facilitates wetting of the fibers by the resin. In fabricating reinforced plastic parts it is very important that the resin fully contact the reinforcing fibers—this is known as wetting. One hundred percent wetting is difficult to achieve with fibers configured in a complicated weave. By providing a fiber configuration of parallel arrangement, the present invention is able to achieve 100% wetting even with high fiber to resin ratios.

Prior to the present invention, reinforced plastic panels could be adhered to wood beams and structures by an epoxy adhesive only, which is more expensive than the adhesives normally used in the preparation of wood laminated products. A commercial grade adhesive that is frequently used in the preparation of laminated wood is resorcinol, which is less expensive than epoxy adhesives. By treating the surfaces of the reinforcing panels 22 to cause the surface to hair up, wherein fibers near the surface 30 are broken and the broken ends 28 are caused to protrude from the resin encasement 26, there is provided a heretofore unknown means for adhering a reinforced plastic panel to a wood structure by means of nonepoxy adhesives.

The preferred method for causing the surface of the reinforcing panel 22 to hair up is by abrading the surface of the panel with 60 grit abrasive in a direction transverse to the longitudinal direction of the panel. The abrading removes a small portion of the resin encasement and exposes fibers that are closest to the surface. Further abrading breaks individual fibers so that one end of the fiber remains in the resin encasement and one end of the fiber protrudes from the resin encasement providing the hairy surface.

Alternative methods of hairing up the surface of the panel 22 will be apparent to those skilled in the art of reinforced plastic fabrication and include chemically treating the surface of the panel prior to curing the resin encasement so as to cause voids in the surface of the panel as it emerges from a curing die thereby removing portions of the resin and exposing underlying fibers. Another alternative method for causing the surface of the panel to hair up is the use of broken rovings. As will be explained below, all the fibers referred to herein are synthetic fibers and the fiber manufacturing process first produces filaments which are grouped together into strands or fibers which are further grouped together into twisted strands, known as yarn, or untwisted strands, known as rovings. Typically the rovings or yarns are woven into a fabric for use in a fabrication process. One type of roving that is available is referred to as a broken roving wherein the roving has been subjected to forces, which fray some of the individual fibers of the roving. By using the broken rovings as a source of fibers to be aligned and encased in the resin encasement, the panel which emerges has surfaces which are haired up.

The panel shown in FIG. 3a is the preferred embodiment of a panel to be used to reinforce the areas of a wood beam 10 subjected to high tension stress. Preferably, the fibers 24 would be aramid fibers or carbon fibers. Aramid fibers are commercially available as "KEVLAR," and the preferred grade for the present invention is "KEVLAR 49." Alternatively, the fibers would be a high modulus polyethylene which is sold commercially as "SPECTRA."

Figure 3B:
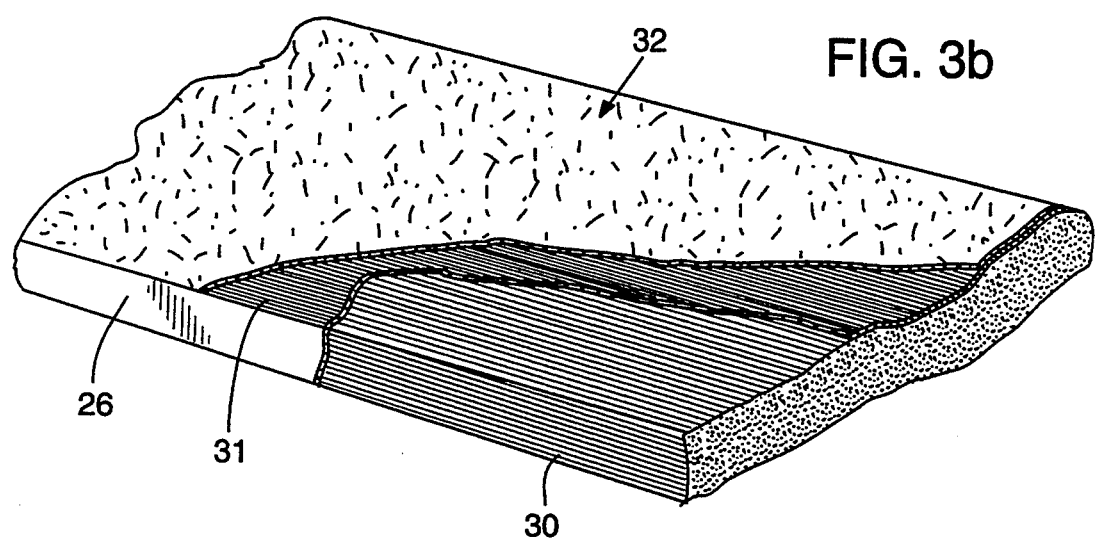

An alternative embodiment of the reinforcing panel is shown in FIG. 3b as a panel having two types of fibers. A first fiber 30 is arranged parallel to one another and aligned with the longitudinal direction of the panel 22 as described above and a second fiber 31 is arranged between the first type of fibers and a surface 32 that will be adhered to the wood structure. This embodiment is most suitable for circumstances which require a first fiber that will not hair up satisfactorily, such as carbon or "SPECTRA." Carbon fibers alone are structurally suitable for a reinforcing panel for a wood beam. However, experimentation has shown that it is not possible to adhere the carbon fiber panel to the wood beam with resorcinol adhesive and efforts to hair up the surface of the carbon fiber panel have proved ineffective. Thus, where it is desirable to use carbon or "SPECTRA" as the first fiber 30, it has been found advantageous to overlay the major surfaces of the panel with aramid fibers as the second fiber 31, which are also encased within the resin encasement 26. The use of aramid fibers permits the panel to be haired up as described above so that it may be adhered to wood beams with nonepoxy adhesives such as resorcinol.

Figure 3C:
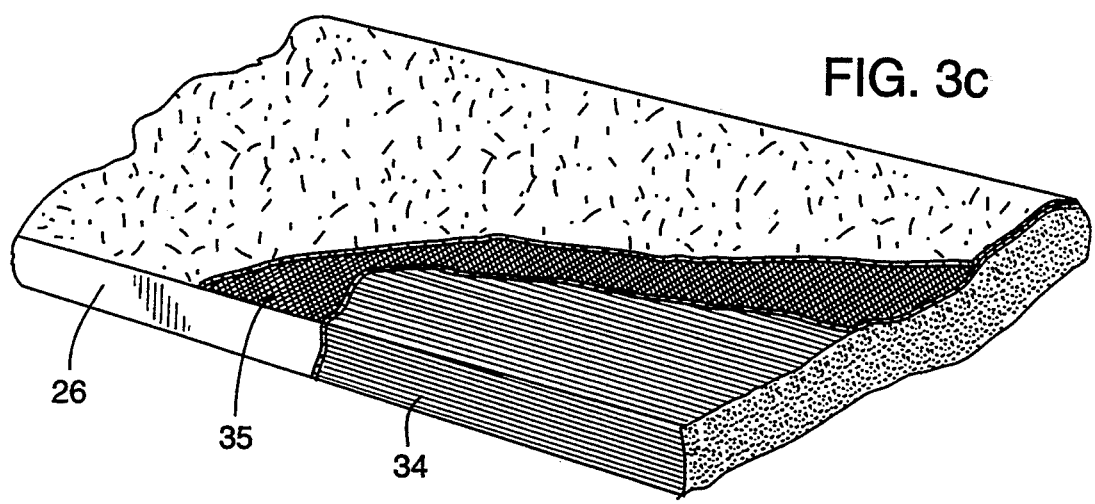

Another alternative embodiment is shown in FIG. 3c as a panel having a first fiber 34 and a fiber mat 35, both of which are encased in the resin encasement 26. This embodiment is most suitable for resin encasements that are made of nonepoxy resins. Experimentation with nonepoxy resin encasements has resulted in interlaminar shear failure in the reinforcing panel 22. Thus, although the optimum configuration of fibers in the reinforcing panel for maximum strength is parallel and longitudinally aligned, the fiber mat 35 improves the interlaminar shear strength of the reinforcing panel 22 by providing fibers that are arranged oblique to the longitudinal direction of the panel and thus resist interlaminar strain.

Preferably, the resin 26 used in fabrication of the panel is an epoxy resin. However, alternative embodiments could use other resins such as polyester, vinyl ester, phenolic resins, polyimides, or polystyrylpyridine (PSP). Alternative embodiments of the present invention could use thermoplastic resins such as poly(ethyleneterephthalate) (PET) and nylon-66.

The reinforcing panel of the present invention provides a panel having an extremely high modulus of elasticity in tension or in compression. However, the reinforcing panel of the present invention has very little lateral strength because substantially all fibers are arranged parallel and aligned longitudinally. The reinforcing panel is so weak transversely that a person of average strength is able to bend the reinforcing panel about its longitudinal axis to the point of breaking the panel. A reinforcing panel of the present design is only useful for reinforcing structures where the loads will be unidirectional and of a direction that can be determined and controlled.

Fabrication of the Reinforcing Panel

As discussed in the prior art, pultrusion is a fabrication process wherein synthetic fibers are wetted in resin and pulled through a heated die to cure the resin which encases the synthetic fibers. All prior art pultrusion fabrication processes use a substantial amount of fibers aligned obliquely to the longitudinal axis of the direction of the pull to provide lateral strength for the pultruded product. In addition, prior art pultrusion processes are carefully controlled to ensure sufficient resin to prevent exposing any of the structural fibers. Also, prior art pultrusion processes do not treat the pultruded product in a way that would expose fibers because it is well known in the reinforced plastics industry that exposed fibers weaken the product and cannot be used where it would be exposed to environmental elements or people.

Figure 1:
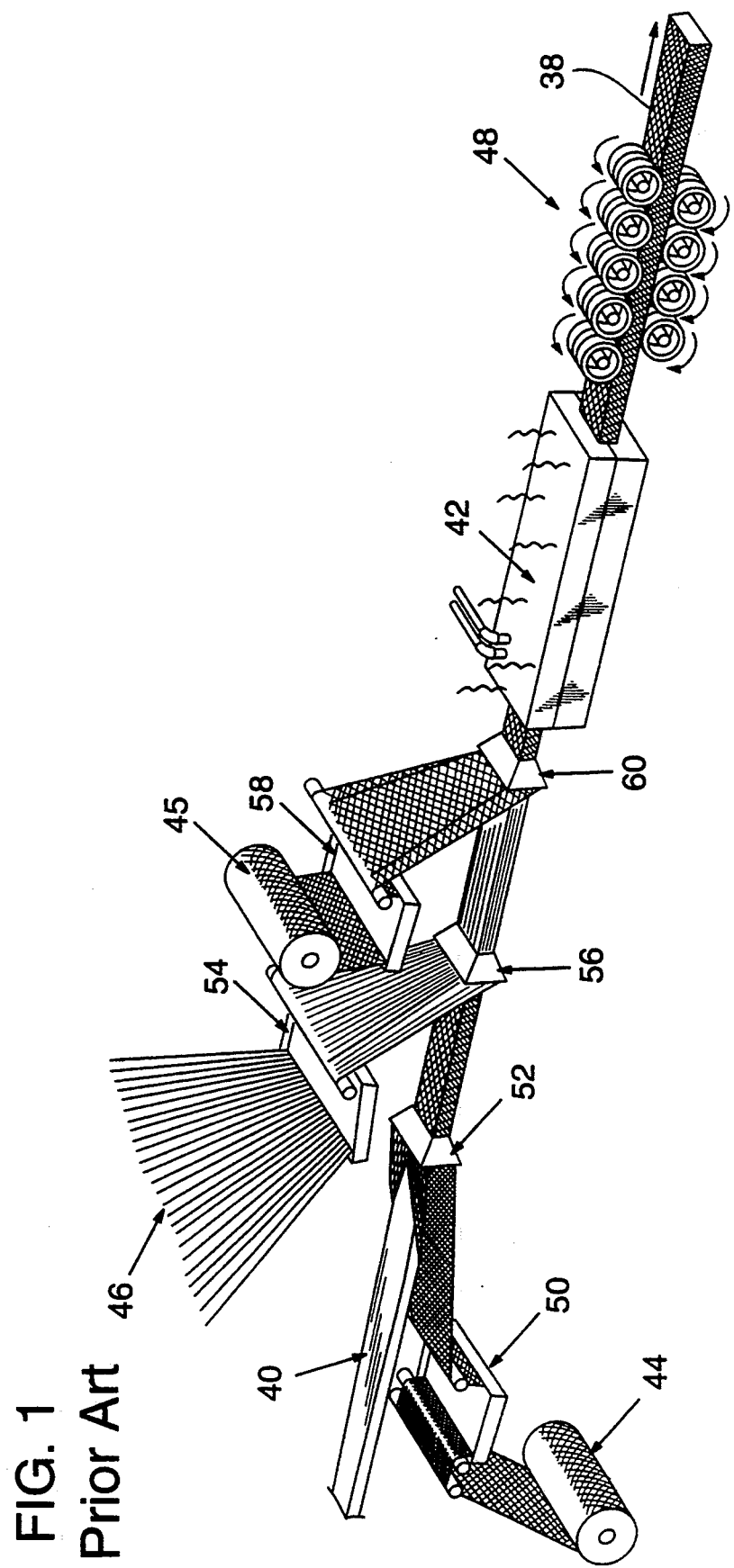
FIG. 1 is a perspective view of a prior art pultrusion fabrication process.
Figure 2:
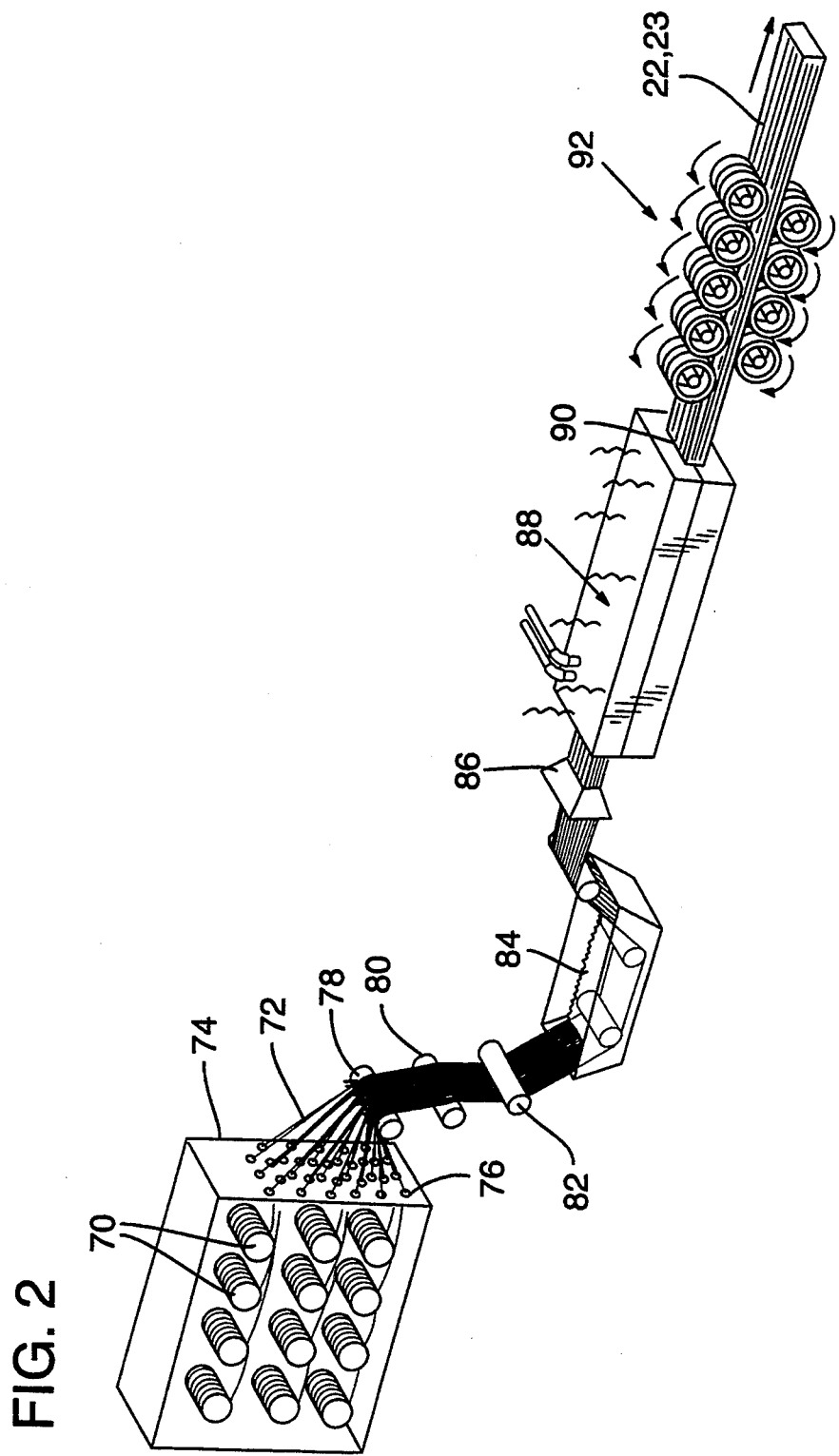
FIG. 2 is a perspective view of a pultrusion process of the present invention which produces an elongate reinforcement panel having substantially all of its fibers arranged parallel to one another and aligned with a longitudinal axis.

With reference to FIG. 1 the prior art pultrusion process will be explained. The pultrusion process shown in FIG. 1 is set up to fabricate a hollow rectangular section member thus requiring a mandrel 40 to maintain the hollow core during the pultrusion process. To fabricate a solid member, the prior art pultrusion process would be modified by eliminating the mandrel 40. The prior art pultrusion process comprises upper and lower mats 44, 45 respectively, that are typically woven rovings or woven fabric. There is also a plurality of rovings 46 that may be longitudinally aligned with the structural member being formed and are sandwiched between the woven mats. Puller 48 provides the force that pulls the fibers through the process. Thus, beginning with lower woven mat 44, the mat is pulled through a resin bath 50 and formed around mandrel 40 by forming die 52. The rovings 46 are likewise wetted in a resin bath 54 and formed around the mandrel/mat combination by forcing die 56. Thereafter, upper woven mat 45 is wetted in a resin bath 58 and formed around the combination of the mandrel 40, lower mat 44, and rovings 46 by forming die 60. Thereafter, the entire combination is pulled through heated die 42 which cures the resin so that the structural member 38 emerges from the die as a rigid member 38.

The present invention improves upon the pultrusion process of the prior art for the purpose of fabricating the reinforcing panel 22 (or 23) of the present invention. Beginning with a plurality of bobbins 70 having synthetic fiber rovings 72 thereon, the rovings are pulled through a card 74 for alignment and to prevent entanglement of the rovings. The card 74 has a plurality of openings 76 through which the rovings 72 pass. The openings 76 are typically gasketed with a low friction material such as a ceramic or plastic to prevent any abrasion or resistance to the rovings 72 from the edges of the openings. After the rovings 72 pass through the card 74, the rovings are gathered and arranged parallel to one another by a first comb 78. After the first comb, the rovings pass over a tensioning mandrel 80 and under a second comb 82 which further maintains the parallel arrangement of the rovings 72. Thereafter, the rovings are wetted in a resin bath 84 and gathered by a forming die 86 prior to entering a heated die 88 having an orifice 90 that shapes the panel 22 (or 23). Heat from the die 88 cures the resin so that the panel which emerges is a substantially rigid member.

The prior art pultrusion process was considered desirable for fabricating continuous lengths of rein-forced plastics. However, by pultruding reinforcing panels of the present invention an unexpected benefit was realized because of the ability to arrange the fibers substantially parallel to one another and aligned with the longitudinal direction of the reinforcing panel. An additional unexpected benefit of the improved pultrusion process of the present invention was the tensioning of the fibers while the resin was cured which provides two benefits. First, the tension in the fibers assists in maintaining the parallel arrangement and alignment of the fibers within the panel. Second, by curing the resin while the fibers are under tension it was found that the resulting reinforcing panel was more rigid and subsequently there was less deflection upon an initial loading of a wood beam reinforced by a reinforcing panel of the present invention. By curing the resin while the fibers were under tension the initial strain of the fibers was set during the fabrication process and, accordingly, when the reinforcing panel was adhered to a wood beam and the beam was loaded, there was less deflection than in beams using reinforcing panels made of fibers that were not in tension during the resin cure.

Experimentation has shown that the optimum tension in the fibers during the resin cure is approximately three to eight pounds. The fiber tension force is created by a back pressure on the rovings which may be accomplished by the tensioning mandrel 80 in combination with the combs 78, 82 or by the use of friction bobbins 70 wherein the rotational friction of the bobbins may be adjusted to provide the desired back pressure on the rovings.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A panel to be adhered to an elongate wood structural member for increasing a load carrying capacity of the structural member, said panel comprising:
   (a) a plurality of reinforcing fibers, a substantial majority of which are continuous along the length of said panel, arranged substantially parallel to one another and aligned so as to comply with a longitudinal direction of said structural member when said panel is adhered to said structural member;
   (b) a resin encasement for said plurality of reinforcing fibers maintaining said parallel arrangement and said longitudinal alignment, and
   (c) fiber material originating from aligned reinforcing fibers closest to a major surface of the panel protruding from the resin encasement of that surface.

2. The panel of claim 1 wherein said fibers are polymeric.

3. The panel of claim 2 wherein said polymeric fibers are aramids.

4. The panel of claim 1 wherein said fibers are polyethylene.

5. The panel of claim 1 wherein said fibers are carbon.

6. The panel of claim 1 wherein said resin encasement is a thermoset resin.

7. The panel of claim 1 wherein said resin encasement is a thermoplastic resin.

8. A panel to be adhered to an elongate wood structural member for increasing a load carrying capacity of the structural member, said panel comprising:
   (a) a plurality of continuous reinforcing fibers, along the length of said panel arranged substantially parallel to one another, and aligned so as to comply with a longitudinal direction of said structural member when said panel is adhered to said structural member;
   (b) a plurality of noncontinuous fibers, originating from said plurality of continuous fibers and protruding therefrom; and
   (c) resin encasing all of said continuous reinforcing fibers but not all said protruding fiber material so that fiber ends protrude beyond the encasing resin along a major surface thereof and serve to facilitate adhesion of said panel to said structural member.

9. The panel of claim 8 wherein said plurality of continuous fibers are carbon and said plurality of noncontinuous fibers are polymeric.

10. The panel of claim 8 wherein said plurality of continuous fibers are polyethylene and said plurality of noncontinuous fibers are polymeric.

11. The panel of claim 8 wherein said plurality of continuous fibers are polyethylene.

12. The panel of claim 8 wherein said plurality of noncontinuous fibers comprise a mat including fibers arranged oblique to said longitudinal direction.

13. The panel of claim 8 wherein said resin encasing is a thermoset plastic.

14. The panel of claim 8 wherein said resin encasing is a thermoplastic plastic.

15. A panel to be adhered to an elongate wood structural member for increasing a load carrying capacity of the structural member, said panel comprising:
   resin encasing,
   a plurality of reinforcing fibers arranged substantially parallel with one another and aligned with respect to the panel to comply with a longitudinal direction of said structural member when said panel is adhered to said structural member, wherein said fibers encased in said resin are maintained in a state of tension, and wherein fibers originating from said reinforcing fibers have ends which protrude from and through said resin encasing along a major surface of the panel.

16. The panel of claim 15 wherein said fibers are carbon.

17. The panel of claim 15 wherein said fibers are polymeric.

18. The panel of claim 17 wherein said polymeric fibers are polyethylene.

19. The panel of claim 15 wherein said resin encasing is a thermoset resin.

20. The panel of claim 15 wherein said resin encasing is a thermoplastic resin.

21. The panel of claim 15 further comprising a mat including fibers arranged oblique to said longitudinal direction, said mat located between said plurality of fibers and a surface of said structural member.

22. A process of making a panel to be adhered to an elongate wood structural member for increasing a load carrying capacity of the structural member, said process comprising of steps:
   (a) arranging substantially all of a plurality of reinforcing fibers substantially parallel with one another so that there are substantially no nonparallel fibers;
   (b) aligning said plurality of fibers within a die that forms said panel;
   (c) wetting said fibers with a curable resin to form an encasement for said plurality of fibers;
   (d) tensioning said fibers;
   (e) curing said resin encasement within said die while said fibers are in tension; and
   (f) causing some portion of fiber material originating from aligned reinforcing fibers closest to a major surface of the panel to protrude from the resin encasement of that surface.

23. The process of claim 22 wherein step (f) comprises abrading said panel after said curing step.

24. The process of claim 22 wherein step (f) comprises voiding portions of said resin by chemical means for causing voids.

25. The process of claim 22 wherein said plurality of fibers comprise broken rovings.

26. The process of claim 22 further comprising the step of cladding said plurality of fibers with a mat prior to wetting, and said wetting step further comprises wetting said mat.

27. The process of claim 26 wherein said plurality of fibers are carbon and said mat is polymeric.

28. A panel made according to the process of claim 22.

* * * * *